US009051210B2

United States Patent
Melscoët-Chauvel et al.

(10) Patent No.: US 9,051,210 B2
(45) Date of Patent: Jun. 9, 2015

(54) β-QUARTZ GLASS-CERAMICS WITH A CONTROLLED TRANSMISSION CURVE AND A HIGH CONTENT OF IRON OXIDE AND OF TIN OXIDE; ARTICLES IN SAID GLASS-CERAMICS, PRECURSOR GLASSES

(71) Applicant: EUROKERA, Chateau-Thierry (FR)

(72) Inventors: Isabelle Marie Melscoët-Chauvel, Bois-le-Roi (FR); Marie Jacqueline Monique Comte, Fontenay aux Roses (FR); Emmanuel Raymond André Lecomte, Nesles la Montagne (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/084,836

(22) Filed: Nov. 20, 2013

(65) Prior Publication Data

US 2014/0141227 A1    May 22, 2014

(51) Int. Cl.
| | |
|---|---|
| C03C 10/12 | (2006.01) |
| C03C 10/14 | (2006.01) |
| C03C 14/00 | (2006.01) |
| C03B 32/02 | (2006.01) |
| C03C 3/087 | (2006.01) |
| C03C 3/085 | (2006.01) |
| C03C 4/02 | (2006.01) |
| C03C 4/10 | (2006.01) |
| C03C 10/00 | (2006.01) |

(52) U.S. Cl.
CPC ............. *C03C 14/006* (2013.01); *C03B 32/02* (2013.01); *C03C 3/087* (2013.01); *C03C 3/085* (2013.01); *C03C 4/02* (2013.01); *C03C 4/10* (2013.01); *C03C 10/0027* (2013.01)

(58) Field of Classification Search
CPC .. C03C 10/0009; C03C 10/0027; C03C 4/02; C03C 4/10; C03B 32/02
USPC .......................................................... 501/4, 7
See application file for complete search history.

(56) References Cited

U.S. PATENT DOCUMENTS

| 8,198,201 B2 * | 6/2012 | Comte et al. ....................... 501/4 |
| 8,722,554 B2 * | 5/2014 | Comte ............................. 501/68 |
| 2011/0226231 A1 | 9/2011 | Siebers et al. ................ 126/211 |
| 2013/0070451 A1 | 3/2013 | Mulet et al. .................... 362/231 |
| 2013/0201678 A1 * | 8/2013 | Siebers et al. ................ 362/231 |
| 2014/0238971 A1 * | 8/2014 | Comte et al. ............. 219/452.12 |

FOREIGN PATENT DOCUMENTS

| WO | 2012010278 | * 1/2012 |
| WO | 2012/156444 | 11/2012 |

OTHER PUBLICATIONS

PCT/EP2013/074387, International Search Report dated Jan. 8, 2014.

* cited by examiner

*Primary Examiner* — Karl Group
(74) *Attorney, Agent, or Firm* — Michael W Russell

(57) ABSTRACT

β-quartz lithium aluminosilicate (LAS) glass-ceramics contain neither arsenic oxide nor antimony oxide, are fined with tin oxide and include vanadium oxide, chromium oxide and a high iron oxide content (>1500 ppm), and have a controlled transmission curve. Articles such as cook-tops can be made from such glass-ceramics.

10 Claims, 1 Drawing Sheet

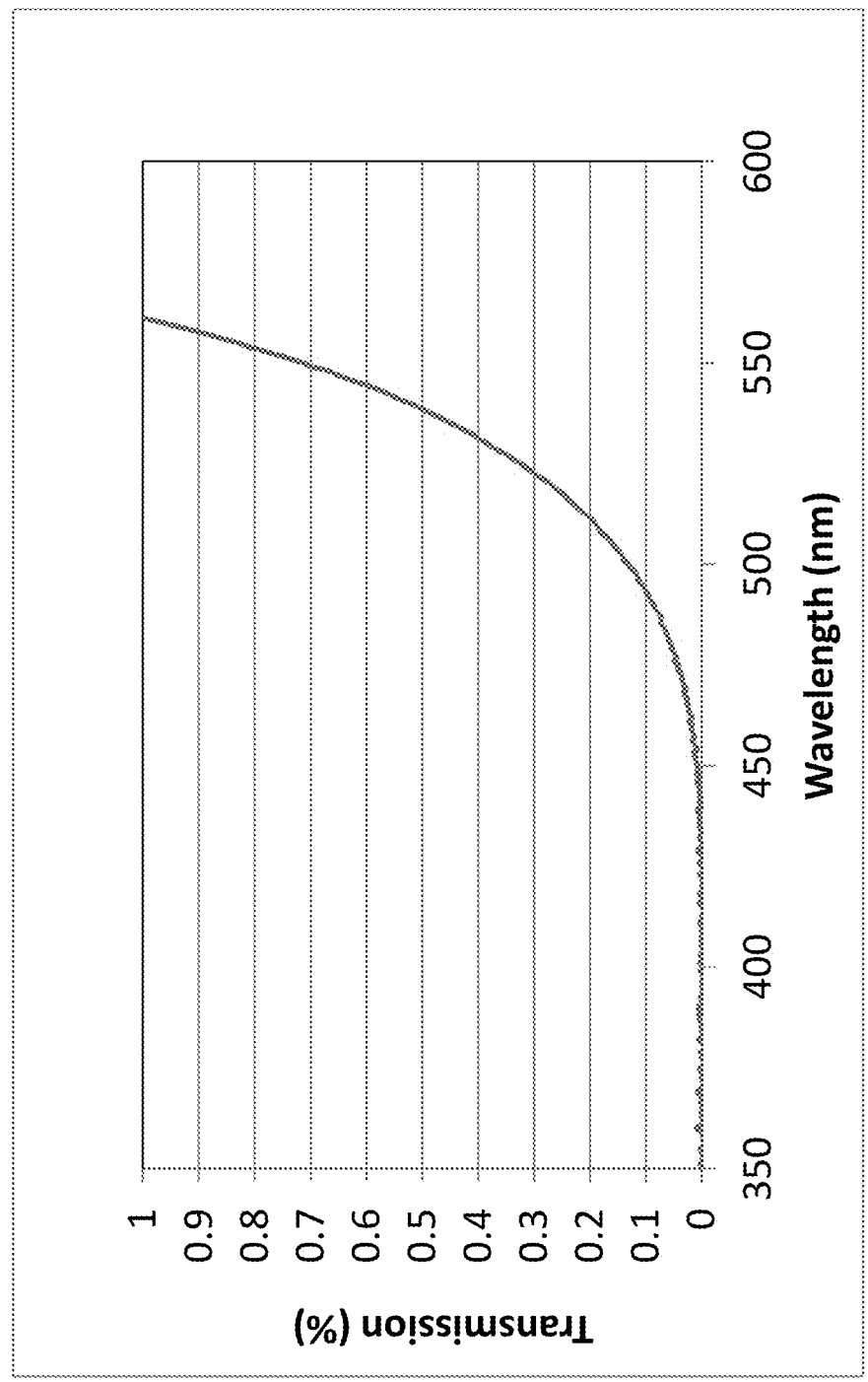

β-QUARTZ GLASS-CERAMICS WITH A CONTROLLED TRANSMISSION CURVE AND A HIGH CONTENT OF IRON OXIDE AND OF TIN OXIDE; ARTICLES IN SAID GLASS-CERAMICS, PRECURSOR GLASSES

CROSS-REFERENCE TO RELATED APPLICATIONS

This application claims the benefit of priority under 35 U.S.C. §119 of French Patent Application Serial No. 1261123 filed on Nov. 22, 2012, the entire content of which is hereby incorporated by reference.

FIELD

The disclosure relates generally to lithium aluminosilicate (LAS) type glass-ceramics, and more particularly to darkened LAS glass-ceramics having a solid solution of β-quartz as the predominant crystalline phase. Also disclosed are articles formed from such glass-ceramics, precursor glasses of such glass-ceramics, and methods for obtaining such glass-ceramics and articles.

BACKGROUND

The disclosure relates to the field of β-quartz glass-ceramics. More particularly it relates to tin-fined, darkened glass-ceramics of the lithium aluminosilicate type, containing a solid solution of β-quartz as the main crystalline phase, essentially free of $As_2O_3$ and of $Sb_2O_3$, articles comprising said glass-ceramics, and lithium aluminosilicate glasses as precursors of such glass-ceramics, as well as methods for forming said glass-ceramics and said articles.

With view to the toxicity of $As_2O_3$ and of increasingly strict regulations in effect, this toxic fining compound is desirably no longer used. For environmental considerations, it is also desired to no longer use $Sb_2O_3$ and not to use halogens, such as F and Br, which would have been able to replace at least partly said fining agents $As_2O_3$ and $Sb_2O_3$.

$SnO_2$ has been proposed as a replacement fining agent. It is notably used when the precursor glass of the glass-ceramic (glass plate precursors of glass-ceramic plates, in fact) is obtained by floating. Indeed, applied with glasses containing $As_2O_3$ and/or $Sb_2O_3$ in their composition, such a floating method generates glass plates with a metal deposit at their surface (a metal deposit resulting from the reduction of $As_2O_3$ and/or $Sb_2O_3$).

The use of $SnO_2$ as a fining agent however has two major drawbacks. It is less efficient than $As_2O_3$ (and, in absolute terms, it should therefore be used in a relatively large amount, which is not without posing any problems, more particularly of devitrification) and, as a more powerful reducing agent than $As_2O_3$ and $Sb_2O_3$, it is responsible for the appearance of an undesirable yellowish coloration during ceramming. This second drawback is of course a nuisance when it is sought to obtain transparent, essentially colorless glass-ceramics. This yellowish coloration results from Sn—Fe, Sn—Ti and Ti—Fe interactions, i.e., by way of charge transfer.

In view of the foregoing, it would be advantageous to provide colored glass-ceramic compositions that are substantially free of $As_2O_3$ and $Sb_2O_3$, and which possess desired optical properties particularly for their use in stove cook-tops.

BRIEF SUMMARY

A glass-ceramic of the lithium aluminosilicate (LAS) type contains a β-quartz solid solution as the predominant crystalline phase and, for a thickness of 4 mm, has an integrated optical transmission, $T_v$, in the visible range, of 0.8 to 2%, an optical transmission at 625 nm of more than 3.5%, an optical transmission at 950 nm between 40 and 70%, and an optical transmission at 1,600 nm between 50 and 75%.

The LAS composition, expressed as percentages by weight of oxides, comprises 0.3 to 0.6% $SnO_2$, 0.02 to 0.15% $V_2O_5$, 0.01 to 0.04% $Cr_2O_3$, greater than 0.15 to 0.32% $Fe_2O_3$, and less than 0.1% $As_2O_3+Sb_2O_3$. A ratio $Fe_2O_3/(V_2O_5*SnO_2)$ of the iron oxide to the product of vanadium oxide and tin oxide is from 5 to 15.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows as well as the claims.

It is to be understood that both the foregoing general description and the following detailed description present embodiments of the subject matter of the present disclosure, and are intended to provide an overview or framework for understanding the nature and character of the subject matter of the present disclosure as it is claimed. Additionally, the descriptions are meant to be merely illustrative, and are not intended to limit the scope of the claims in any manner.

BRIEF DESCRIPTION OF THE DRAWINGS

The FIGURE shows the optical transmission spectrum of a glass-ceramic plate according to Example 1.

DETAILED DESCRIPTION

Glass-ceramics colored with vanadium oxide ($V_2O_5$) can have a coefficient of thermal expansion close to zero in order to withstand thermal shock. For use as cooktops, they may possess a specific suite of optical transmission properties. In embodiments, the optical transmission curves for a 4 mm thick plate of the glass-ceramic include an integrated optical transmission $T_v$, in the visible range (i.e., between 380 and 780 nm) measured with the illuminant D65 with an angle of 2° to the observer of 0.8 to 2% (e.g., 1 to 1.7%). If the integrated optical transmission is greater than 2%, heating elements located under the plate will not be properly concealed when the cooktop is not in operation. If the integrated optical transmission is less than 0.8%, the heating elements will not be suitable visible during operation, which may pose a safety hazard.

In addition to the integrated transmission, the optical transmission at 625 nm ($T_{625}$) in embodiments is greater than 3.5% (e.g., greater than 4%). With this, it is possible to see red displays disposed under the plate. The optical transmission at 950 nm (near infrared), ($T_{950}$) can be between 40 and 70% (e.g., from 50 to 70%). A near-IR transmission greater than or equal to 50% makes it possible to use conventional electronic control buttons, emitting and receiving at these wavelengths. The infrared optical transmission at 1,600 nm ($T_{1600}$) can be between 50 and 75%. If the infrared optical transmission is less than 50%, the heating performances of the plates are not satisfactory, and if said infrared optical transmission is greater than 75%, the heating performance may be excessive and, for example, induce dangerous heating of materials placed in proximity to the plate.

Boiling point measurement tests (of water) have shown that a transmission at 1,600 nm greater than or equal to 50% is sufficient to provide a satisfactory boiling time.

Boiling point tests were carried out by placing the glass-ceramic to be tested on a hotplate with a diameter of 145 mm. Two tests were carried out by calibrating the hotplate so that the maximum surface temperature of the glass-ceramic was 560° C. or 620° C. In each case, the time required to raise the temperature of a liter of water from 20 to 98° C. was measured. The water was placed in a pot covered with aluminum of the same diameter as the hotplate. Two comparative glass-ceramics were tested: Kerablack® glass-ceramic with a transmission of 67.9% at 1,600 nm and a glass-ceramic called "Glass-ceramic T" with a transmission of 54.9% at 1,600 nm. Results of the two materials are not significantly different (to be considered significantly different, the difference between two boiling times must exceed 30 s).

TABLE 1

Boiling point data for comparative glass-ceramic plates

| Glass-ceramic | "T" | | Kerablack ® Glass-Ceramic | |
|---|---|---|---|---|
| Transmission at 1,600 nm | 54.9% | | 67.9% | |
| Maximum surface temperature | 560° C. | 620° C. | 560° C. | 620° C. |
| Boiling time | | | | |
| Test 1 | 7' 14" | 6' 27" | 6' 40" | 6' 29" |
| Test 2 | 9' 26" | 7' 29" | 9' 26" | 7' 31" |

While the boiling point data are satisfactory, each of the comparative compositions contains arsenic oxide as a fining agent. During the successive glass-ceramic formation steps of melting and fining of a vitrifiable load of raw materials, shaping, and crystallization (i.e., ceramming), the avoidance of arsenic oxide (and antimony oxide) as fining agents is desirable.

In various embodiments, glass-ceramics are disclosed having comparable optical transmission properties to Kerablack® glass-ceramic plates, but without the inclusion of arsenic oxide or antimony oxide in the composition.

Example glass-ceramic compositions include $Fe_2O_3$ and relatively low $SnO_2$ content. Relatively high $Fe_2O_3$ content enables the use of starting materials that are less pure and thus less expensive, including a greater quantity of recycled materials (cullet). However, it is believed that the addition of iron oxide has an impact on the optical qualities of the product obtained, in terms of transmission in the visible as well as in the infrared.

Meanwhile, $SnO_2$ is an expensive raw material. Therefore, a relatively low content of tin oxide makes it possible to limit the raw material cost as well as minimize adverse effects associated with the condensation of tin metal within the furnace.

In such a context, disclosed are glass-ceramic compositions that are free of arsenic (and of antimony) or containing only traces thereof, including tin oxide and a high iron oxide content, and having an optimized optical transmission curve in the visible and infrared ranges. Such glass ceramics can be fined at conventional fining temperatures, generally between 1,600 and 1,700° C.

The disclosed compositions include relatively low proportions of $SnO_2$ (which provides a fining agent function and a reducing agent function, where the reducing agent participates in the final coloration of the product), high proportions of $Fe_2O_3$, and one or more of $V_2O_5$ and $Cr_2O_3$ as coloring species.

In embodiments, the disclosed glass-ceramics are lithium aluminosilicate (LAS) type glass-ceramics containing $Li_2O$, $Al_2O_3$ and $SiO_2$ as essential constituents of the β-quartz solid solution, where a β-quartz solid solution is the predominant crystalline phase accounting for more than 80% by weight of the total crystalline phase of the crystallized fraction.

The disclosed glass-ceramics exhibit optical transmission characteristics, for a thickness of 4 mm of: $0.8\% \leq T_v \leq 2\%$, for example, $1\% \leq T_v 1.7\%$, $T_{625} > 3.5\%$, for example, $T_{625} > 4\%$, $40\% \leq T_{950} \leq 70\%$, for example, $50\% \leq T_{950} \leq 70\%$, and $50\% \leq T_{1600} \leq 75\%$.

In further embodiments, the composition of the glass-ceramics, expressed as percentages by weight of oxides, includes $SnO_2$: 0.3 to 0.6%, for example >0.3 to 0.6%, $V_2O_5$: 0.02 to 0.15%, for example, >0.06 to 0.15%, $Cr_2O_3$: 0.01 to 0.04%, $Fe_2O_3$: >0.15 to 0.32%, $As_2O_3+Sb_2O_3$: <0.1%, and a ratio $Fe_2O_3/(V_2O_5*SnO_2)$ of 5 to 15. In contrast, Kerablack® glass-ceramics contain roughly 700 ppm of $Fe_2O_3$.

The glass-ceramics have a dark color and are suitable for use, for example, as cooktops.

The glass-ceramics contain neither any $As_2O_3$, nor any $Sb_2O_3$ or only contain traces of at least one of these compounds, $SnO_2$ being present instead of and in place of these conventional fining agents. If traces of at least one of these compounds are present, this is as a contaminating product, which is likely due to the presence of recycled materials in the vitrifiable load of raw materials. In any case, only traces of these toxic compounds are likely to be present: $As_2O_3 + Sb_2O_3 < 1,000$ ppm.

The compositions include tin oxide. The content of tin oxide can be controlled to achieve the desired fining while avoiding devitrification or adverse effects on the color package. Notably, $SnO_2$ is capable of reducing vanadium and the iron present during ceramming. The $SnO_2$ content can be greater than 0.3 wt. %. In embodiments, the $SnO_2$ content ranges from 0.3 to 0.6 wt. %, for example >0.3 to 0.5%, 0.32 to 0.48 or about 0.35%, e.g. 0.35±0.03%. The measurement uncertainty for the $SnO_2$ content is +/−50 ppm (+/−0.005%).

Vanadium oxide is used as a coloring agent. Indeed, $V_2O_5$ in the presence of $SnO_2$ may significantly darken the glass during its ceramming $V_2O_5$ is responsible for absorption mainly below 700 rim and it is possible in its presence to retain sufficiently high transmission in the infrared. An amount of $V_2O_5$ between 0.02-0.15% (i.e., between 200 and 1500 ppm) may be used. In embodiments, the $V_2O_5$ content is between 0.045 and 0.15%, such as between >0.06 to 0.15%.

It is challenging in a glass-ceramic comprising both $SnO_2$ and $V_2O_5$ to obtain the sought after integrated optical transmission ($T_v$) and the required optical transmission at 625 nm ($T_{625}$). Indeed, insofar that the absorption due to vanadium is relatively high at this wavelength (625 nm), when an acceptable value is reached for the integrated optical transmission, the value of the optical transmission at 625 nm may be too low and vice versa.

Applicants have solved the challenge by combining chromium oxide with vanadium oxide to create a coloring package (comprising $V_2O_5$, $Cr_2O_3$ and $Fe_2O_3$) capable of providing the desired optical properties.

Chromium oxide ($Cr_2O_3$) can be used as a darkening agent in the visible range (400-600nm) while retaining high transmission in the wavelengths between 600 and 800 nm. The amount of $Cr_2O_3$ may range from 0.01 to 0.04% by weight. For instance, the $Cr_2O_3$ content may range from >0.015-0.04%, e.g., >0.015-0.025% or 0.016-0.025%.

The glass-ceramics thus exhibit very low transmission in the blue range. For a thickness of 4 mm, the disclosed glass-ceramics generally have an optical transmission at 450 nm of less than 0.1% ($T_{450} < 0.1\%$), and/or an optical transmission at 465 nm of less than 0.1% ($T_{465} < 0.1\%$).

Iron oxide promotes absorption mainly in the infrared. In order to make efficient use of recycled products and low-cost starting materials, the $Fe_2O_3$ content may be greater than 1500 ppm, e.g., at least 1,510 ppm or at least 1600 ppm. If the $Fe_2O_3$ content exceeds 3,200 ppm, however, absorption in the infrared may be too high. Such a high $Fe_2O_3$ content may also complicate the melting and fining processes. In example glass-ceramics, the iron oxide content is between 1,600 and 2,500 ppm, e.g., between 1,600 and 2,000 ppm. It was surprisingly observed that a transmission at 1,600 rim greater than 50% could be obtained with iron oxide contents up to 3,200 ppm. Further, iron oxide content in the range of 1,500 to 3200 ppm promotes fining in combination with a relatively low amount of tin oxide. The combination of a relatively low $SnO_2$ content and high iron oxide content is thus particularly relevant both to decreasing costs and to maintaining proper fining capacities. The measurement uncertainty for the $Fe_2O_3$ content is +/−50 ppm (+/−0.005%).

In the visible range, iron is also involved in the coloration process. Its effect within the disclosed compositions may be compensated by that of the vanadium. It was observed that for an $Fe_2O_3$ content between >1,500 and 3,200 ppm, transmission in the visible range increased with increasing iron content. It is believed that over this range of iron content, tin oxide preferentially reduces $Fe_2O_3$ rather than $V_2O_5$. Such lightening of the glass-ceramic may then be compensated by controlling the $V_2O_5$ content. Further, it is believed that the percentage of vanadium reduced is as large as the increase in $SnO_2$ content. Thus, in embodiments, the $Fe_2O_3/(V_2O_5 * SnO_2)$ ratio ranges from 5 to 15, e.g., 6 to 13, or 7 to 12.

In addition to $V_2O_5$, $Cr_2O_3$ and $Fe_2O_3$, other coloring agent such as $CoO$, $MnO_2$, $NiO$, $CeO_2$ may be included. In order to avoid significantly modifying the optical transmission curve, such additional colorants may be limited. CoO, for example, may be present in a very small amount insofar that it strongly absorbs in the infrared and at 625 nm. The disclosed glass-ceramics may include less than 200 ppm, e.g., less than 100 ppm of CoO.

According to further embodiments, the glass-ceramics do not contain any fining auxiliaries such as F and Br, except for inevitable traces. This is particularly advantageous considering the toxicity of these components.

In addition to $SnO_2$, $V_2O_5$, $Cr_2O_3$ and $Fe_2O_3$ in the weight percentages specified above (with $As_2O_3+Sb_2O_3<1,000$ ppm), the glass-ceramic compositions may include:

| | |
|---|---|
| $SiO_2$ | 60-72 |
| $Al_2O_3$ | 18-23 |
| $Li_2O$ | 2.5-4.5 |
| MgO | 0-3 |
| ZnO | 0-3 |
| $TiO_2$ | 1.5-4 |
| $ZrO_2$ | 0-2.5 |
| BaO | 0-5 |
| SrO | 0-5 |
| BaO + SrO | 0-5 |
| CaO | 0-2 |
| $Na_2O$ | 0-1.5 |
| $K_2O$ | 0-1.5 |
| $P_2O_5$ | 0-5 |
| $B_2O_3$ | 0-2. |

According to embodiments, the glass-ceramics may have a composition consisting essentially of at least 98% by weight, e.g., at least 99% by weight, or even 100% by weight of $SnO_2$, $V_2O_5$, $Cr_2O_3$, $Fe_2O_3$, $As_2O_3$, $Sb_2O_3$, $SiO_2$, $Al_2O_3$, $Li_2O$, MgO, ZnO, $TiO_2$, $ZrO_2$, BaO, SrO, CaO, $Na_2O$, $K_2O$, $P_2O_5$ and $B_2O_3$. A corresponding base glass may be less viscous than competitive glasses such as glasses used to form Kerablack® glass-ceramic products. Indeed, the presently disclosed glass ceramics, which may exhibit less darkening during post-ceramming heat treatments, may be suitable alternatives to Kerablack® glass-ceramics.

The disclosed glass-ceramics may have a coefficient of thermal expansion lower than $10 \times 10^{-7}$ $K^{-1}$ over the range 25° C. to 700° C., e.g., less than $3 \times 10^{-7}$ $K^{-1}$.

Further embodiments relate to articles comprising the disclosed glass-ceramic compositions. Such articles may consist essentially of or consist of the glass-ceramic. Example articles are cooktops, cooking utensils or microwave oven trays.

Still further embodiments relate to lithium aluminosilicate glasses that are precursors of the glass-ceramics. A precursor glass may have a composition equal to the corresponding glass-ceramic composition.

Methods for forming glass-ceramics and articles comprising the glass-ceramics are also disclosed. Such methods may include heat treating a vitrifiable load of raw materials under conditions which successively ensure melting, fining and then ceramming An example method for forming a glass-ceramic article successively comprises melting a load of vitrifiable raw materials, said load containing $SnO_2$ as a fining agent, fining of the obtained molten glass, cooling the fined molten glass and simultaneously shaping it to a desired shape for the article, and heat treating the shaped glass to transform the glass into a glass-ceramic.

EXAMPLES

Raw materials were combined to form 1kg batches having the compositions summarized in Table 1. The mixtures were placed in platinum crucibles and melted at 1,650° C. After melting, the glasses were rolled to a thickness of 5 mm and annealed at 650° C. for 1 hr. Glass samples (in the form of plates of about 10 cm×10 cm) undergo a crystallization treatment comprising a fast heating to 650° C., heating from 650° C. to 820° C. at a heating rate of 5° C./min, heating from 820° C. to the maximum crystallization temperature, $T_{max}=920°$ C. at a heating rate of 15° C./min, maintaining $T_{max}$ for 8 minutes, then cooling at the cooling rate of the oven.

The optical properties of the obtained glass-ceramic plates are measured on polished samples with a thickness of 4 mm. The illuminant D65 (observer at)2° was used. $T_v$ is the integrated transmission in the visible range, and $T_{450}$, $T_{465}$, $T_{625}$, $T_{950}$ and $T_{1600}$ are the transmissions measured at 450, 465, 625, 950 and 1,600 nm respectively.

In Table 1b, the Examples A, B, C and D are comparative. Example A is a Kerablack® glass-ceramic, which contains arsenic. Example B has an $Fe_2O_3/(V_2O_5*SnO_2)$ ratio that is too low and a visible transmission that is too low. Example C has a $Fe_2O_3$ content that is too high and its transmission at 1,600 rim is too low. Example D has an $Fe_2O_3/(V_2O_5*SnO_2)$ ratio that is too high and its visible transmission is too high.

TABLE 1a

| Example Glass-Ceramics | | | | | |
|---|---|---|---|---|---|
| Examples | 1 | 2 | 3 | 4 | 5 |
| $SiO_2$ | 64.68 | 64.667 | 64.383 | 64.448 | 64.634 |
| $Al_2O_3$ | 20.93 | 20.94 | 21.12 | 21.04 | 20.75 |
| $Li_2O$ | 3.8 | 3.8 | 3.8 | 3.8 | 3.8 |

TABLE 1a-continued

Example Glass-Ceramics

| Examples | 1 | 2 | 3 | 4 | 5 |
|---|---|---|---|---|---|
| MgO | 0.34 | 0.34 | 0.34 | 0.33 | 0.34 |
| ZnO | 1.5 | 1.5 | 1.52 | 1.51 | 1.5 |
| BaO | 2.5 | 2.51 | 2.56 | 2.53 | 2.51 |
| $TiO_2$ | 3.05 | 3.03 | 3.03 | 3.04 | 3.03 |
| $ZrO_2$ | 1.39 | 1.36 | 1.34 | 1.34 | 1.33 |
| $SnO_2$ | 0.35 | 0.35 | 0.35 | 0.36 | 0.45 |
| $Na_2O$ | 0.56 | 0.55 | 0.58 | 0.58 | 0.57 |
| $K_2O$ | 0.25 | 0.24 | 0.24 | 0.25 | 0.26 |
| CaO | 0.42 | 0.43 | 0.43 | 0.42 | 0.43 |
| $V_2O_5$ | 0.058 | 0.065 | 0.08 | 0.09 | 0.047 |
| $Fe_2O_3$ | 0.151 | 0.197 | 0.205 | 0.239 | 0.227 |
| $Cr_2O_3$ | 0.0198 | 0.0199 | 0.021 | 0.0222 | 0.0198 |
| CoO | 0.0012 | 0.0011 | 0.001 | 0.0008 | 0.0012 |
| $Fe_2O_3/(V_2O_5*SnO_2)$ | 7.44 | 8.66 | 7.32 | 7.38 | 10.7 |
| Tv (%) | 1.08 | 1.5 | 1.39 | 1.21 | 1.09 |
| T 450 (%) | 0.01 | 0.01 | 0.01 | 0.01 | 0.01 |
| T 625 (%) | 3.78 | 4.99 | 4.70 | 4.28 | 3.81 |
| T 950 (%) | 52.56 | 53.94 | 52.69 | 48.41 | 50.08 |
| T 1600 (%) | 60.35 | 59.94 | 59.87 | 55.72 | 54.39 |

TABLE 1b

Comparative Glass-Ceramics

| Examples | A | B | C | D |
|---|---|---|---|---|
| $SiO_2$ | | 64.868 | 64.757 | 64.759 |
| $Al_2O_3$ | | 20.65 | 20.55 | 20.81 |
| $Li_2O$ | | 3.8 | 3.8 | 3.8 |
| MgO | | 0.33 | 0.33 | 0.34 |
| ZnO | | 1.41 | 1.49 | 1.45 |
| BaO | | 2.48 | 2.51 | 2.51 |
| $TiO_2$ | | 3.05 | 3.03 | 3.04 |
| $ZrO_2$ | | 1.41 | 1.4 | 1.34 |
| $SnO_2$ | | 0.35 | 0.35 | 0.36 |
| $Na_2O$ | | 0.56 | 0.56 | 0.57 |
| $K_2O$ | | 0.26 | 0.26 | 0.25 |
| CaO | | 0.42 | 0.43 | 0.43 |
| $V_2O_5$ | | 0.167 | 0.148 | 0.04 |
| $Fe_2O_3$ | | 0.218 | 0.358 | 0.281 |
| $Cr_2O_3$ | | 0.0262 | 0.026 | 0.0194 |
| CoO | | 0.0008 | 0.001 | 0.0006 |
| $Fe_2O_3/(V_2O_5*SnO_2)$ | | 3.73 | 6.91 | 19.51 |
| Tv (%) | 0.8-2.0 | 0.38 | 0.68 | 4.88 |
| T 450 (%) | | 0.00 | 0.00 | 0.05 |
| T 625 (%) | ≥3.5 | 1.59 | 2.67 | 12.80 |
| T 950 (%) | 40-70 | 42.41 | 35.42 | 50.40 |
| T 1600 (%) | 50-75 | 55.77 | 45.81 | 52.40 |

Several additional characterizations were carried out on select glass-ceramics. The coefficient of thermal expansion between 25° C. and 700° C. ($CTE_{25-700° C.}$ ($10^{-7} K^{-1}$)) and an x-ray diffraction analysis were conducted on Example 2. The x-ray data were used to calculate the percentage by weight of the beta-quartz phase and the average size of these crystals. The CTE value was $2.4 \times 10^{-7} K^{-1}$. The sample included 95 wt. % beta-quartz having an average crystallite size of 34 nm.

An optical transmission spectrum of the Example 1 glass-ceramic plate is shown in the FIGURE.

As used herein, the singular forms "a," "an" and "the" include plural referents unless the context clearly dictates otherwise. Thus, for example, reference to a "vitrifiable raw material" includes examples having two or more such "vitrifiable raw materials" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. Any recited single or multiple feature or aspect in any one claim can be combined or permuted with any other recited feature or aspect in any other claim or claims.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a glass-ceramic that comprises a various oxides include embodiments where a glass-ceramic consists of such oxides and embodiments where a glass-ceramic consists essentially of a such oxides.

It will be apparent to those skilled in the art that various modifications and variations can be made to the present invention without departing from the spirit and scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

We claim:

1. A glass-ceramic of the lithium aluminosilicate type, containing a β-quartz solid solution as the predominant crystalline phase and having for a thickness of 4 mm:
    an integrated optical transmission, $T_v$, in the visible range, of 0.8 to 2%;
    an optical transmission at 625 nm of more than 3.5%;
    an optical transmission at 950 nm between 40 and 70%; and
    an optical transmission at 1,600 nm between 50 and 75%,
wherein its composition, expressed as percentages by weight of oxides, comprises:
    $SnO_2$ 0.3-0.6;
    $V_2O_5$ 0.02-0.15;
    $Cr_2O_3$ 0.01-0.04;
    $Fe_2O_3$ >0.15-0.32;
    $As_2O_3+Sb_2O_3$ <0.1; and
    $Fe_2O_3/(V_2O_5*SnO_2)$ 5-15.

2. The glass-ceramic according to claim 1, comprising $SnO_2$ 0.32-0.48.

3. The glass-ceramic according to claim 1, comprising $Fe_2O_3$ 0.16-0.25.

4. The glass-ceramic according to claim 1, comprising less than 200 ppm CoO.

5. The glass-ceramic according to claim 1, the composition of which is free of F and of Br, except for inevitable traces.

6. The glass-ceramic according to claims 1, further comprising:

| | |
|---|---|
| $SiO_2$ | 60-72 |
| $Al_2O_3$ | 18-23 |
| $Li_2O$ | 2.5-4.5 |
| MgO | 0-3 |
| ZnO | 0-3 |
| $TiO_2$ | 1.5-4 |
| $ZrO_2$ | 0-2.5 |
| BaO | 0-5 |
| SrO | 0-5 |
| BaO + SrO | 0-5 |
| CaO | 0-2 |
| $Na_2O$ | 0-1.5 |
| $K_2O$ | 0-1.5 |
| $P_2O_5$ | 0-5, and |
| $B_2O_3$ | 0-2. |

7. The glass-ceramic according to claim 6, the composition of which comprises at least 98% by weight of $SnO_2$, $V_2O_5$, $Cr_2O_3$, $Fe_2O_3$, $SiO_2$, $Al_2O_3$, $Li_2O$, MgO, ZnO, $TiO_2$, $ZrO_2$, BaO, SrO, CaO, $Na_2O$, $K_2O$, $P_2O_5$ and $B_2O_3$.

8. An article comprising the glass-ceramic according to claim 1.

9. The article according to claim 8, selected from the group consisting of a cooktop, a cooking utensil and a microwave oven tray.

10. A method for forming an article according to claim 8, successively comprising:
melting a load of vitrifiable raw materials, said load containing $SnO_2$ as a fining agent;
fining of the obtained molten glass;
cooling the fined molten glass and simultaneously shaping it to a desired shape for the article; and
heat treating the shaped glass to transform the glass into a glass-ceramic.

* * * * *